(12) United States Patent
Lien et al.

(10) Patent No.: US 12,299,344 B2
(45) Date of Patent: *May 13, 2025

(54) SYNCHRONIZING LOCAL ROOM AND REMOTE SHARING

(71) Applicant: BARCO N.V., Kortrijk (BE)

(72) Inventors: Steven Lien, Taipei (TW); Madhwan Misra, New Delhi (IN); Audi Hsu, New Taipei (TW)

(73) Assignee: BARCO N.V., Kortrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,529

(22) Filed: Jan. 26, 2024

(65) Prior Publication Data
US 2024/0329911 A1 Oct. 3, 2024

Related U.S. Application Data

(63) Continuation of application No. 17/759,429, filed as application No. PCT/EP2021/051775 on Jan. 26, 2021, now Pat. No. 11,900,006.

(30) Foreign Application Priority Data

Jan. 26, 2020 (EP) .................................... 20153753

(51) Int. Cl.
*G06F 3/14* (2006.01)
*H04L 67/1095* (2022.01)
*H04N 7/15* (2006.01)

(52) U.S. Cl.
CPC ........ *G06F 3/1454* (2013.01); *H04L 67/1095* (2013.01); *H04N 7/152* (2013.01)

(58) Field of Classification Search
CPC .... G06F 3/1454; H04L 67/1095; H04N 7/152
See application file for complete search history.

(56) References Cited

U.S. PATENT DOCUMENTS

| | | |
|---|---|---|
| 6,850,967 B1 | 2/2005 | Spencer et al. |
| 6,877,027 B1 | 4/2005 | Spencer et al. |
| 6,971,110 B1 | 11/2005 | Marks et al. |
| 6,994,259 B2 | 2/2006 | Watters |
| 9,338,400 B1 | 5/2016 | Krishnan et al. |

(Continued)

FOREIGN PATENT DOCUMENTS

| | | |
|---|---|---|
| CN | 105491156 A | 4/2016 |
| CN | 110248142 A | 9/2019 |

(Continued)

OTHER PUBLICATIONS

International Search Report and Written Opinion issued in PCT/EP2021/051775, dated Apr. 26, 2021, 12 pages provided.

(Continued)

*Primary Examiner* — Michael Pervan
(74) *Attorney, Agent, or Firm* — HSML P.C.

(57) ABSTRACT

A method, a system and devices for data sharing by teleconferencing with local projection of the same shared data in a local meeting room are described. A method, a system and devices for synchronizing display of content in a local room and remote sharing of the same content as well are also described. A method, a system and devices for providing access to shared multimedia content within a defined room environment as well as with a remote user are also described.

24 Claims, 4 Drawing Sheets

(56) References Cited

U.S. PATENT DOCUMENTS

| | | |
|---|---|---|
| 9,877,266 B1 | 1/2018 | Knas et al. |
| 10,454,979 B2 | 10/2019 | Thomas et al. |
| 11,770,354 B2 | 9/2023 | Delp |
| 2004/0124247 A1 | 7/2004 | Watters |
| 2005/0071430 A1 | 3/2005 | Kobayashi et al. |
| 2005/0172080 A1 | 8/2005 | Miyauchi |
| 2009/0110167 A1 | 4/2009 | Parker et al. |
| 2009/0110169 A1 | 4/2009 | Whitsell et al. |
| 2009/0112926 A1 | 4/2009 | Parker et al. |
| 2009/0112996 A1 | 4/2009 | Baker et al. |
| 2009/0119365 A1 | 5/2009 | Tomic |
| 2011/0107238 A1 | 5/2011 | Liu et al. |
| 2012/0185291 A1 | 7/2012 | Ramaswamy et al. |
| 2013/0268849 A1 | 10/2013 | Du |
| 2014/0063174 A1 | 3/2014 | Junuzovic et al. |
| 2014/0064471 A1 | 3/2014 | Krishnan et al. |
| 2014/0344420 A1 | 11/2014 | Rjeili et al. |
| 2015/0050967 A1 | 2/2015 | Bao et al. |
| 2015/0244699 A1 | 8/2015 | Hessler |
| 2015/0319178 A1 | 11/2015 | Desai et al. |
| 2015/0334511 A1 | 11/2015 | Rivera et al. |
| 2017/0006162 A1 | 1/2017 | Bargetzi et al. |
| 2017/0099361 A1 | 4/2017 | Digilov et al. |
| 2018/0352192 A1 | 12/2018 | Matsubara |
| 2019/0043148 A1 | 2/2019 | Vemury |
| 2019/0068734 A1 | 2/2019 | Cutler et al. |
| 2020/0014733 A1 | 1/2020 | Vanderheeren et al. |

FOREIGN PATENT DOCUMENTS

| | | |
|---|---|---|
| CN | 110597472 A | 12/2019 |
| JP | H05260194 A | 10/1993 |
| JP | 2003091489 A | 3/2003 |
| JP | 2003284020 A | 10/2003 |
| JP | 2018191307 A | 11/2018 |
| WO | 2017090076 A1 | 6/2017 |

OTHER PUBLICATIONS

The extended European search report issued in European Application No. 20153753.7, dated Jun. 17, 2020.

Search Report issued in Singapore Application No. 11202250684G, mailed Dec. 6, 2024.

Written Opinion issued in Singapore Application No. 11202250684G, mailed Dec. 31, 2024.

Office Action issued in Japanese Patent Application No. 2022-545106, mailed Feb. 4, 2025, with English translation.

Communication issued in European Application No. 21 705 437.8, mailed Mar. 13, 2025.

SYNCHRONIZING LOCAL ROOM AND REMOTE SHARING

CROSS-REFERENCE

This application is a continuation application that claims the benefit of U.S. application Ser. No. 17/759,429, filed Jul. 25, 2022, which is the national stage of international application PCT/EP2021/051775, filed Jan. 26, 2021, which claims the benefit of European application EP20153753.7, filed Jan. 26, 2020, all of which are incorporated herein by reference.

The present invention relates to a method, a system and devices for data sharing by teleconferencing with local projection of the shared data in a local meeting room. The present invention relates to a method, a system and devices for synchronizing local room and remote sharing.

BACKGROUND

Allowing ad hoc groups of persons to communicate with each other is one of the fundamental aspects of collaboration, problem solving, negotiation, teaching and education, etc. To assist in communication, there has been an explosion of electronic communication tools such as electronic conferencing tools, e.g. synchronous and asynchronous conferencing, online chat, Instant Messaging, audio conferencing, videoconferencing, data conferencing, application sharing, remote desktop sharing, electronic meeting systems, collaborative management (coordination) tools, project management systems, knowledge management systems, and social software systems.

Collaboration between local and remote is often attempted via teleconferencing. Participants who join a meeting in a foreign location can bring with them processing devices such as smartphones, tablets, laptops, e-readers, etc. and they may expect to be able to receive or transmit or display digital content.

Such processing devices may have connections for one or more of a variety of ports such as HDMI, VGA, DisplayPort, Thunderbolt, USB, etc. These can be operated in a meeting through wired or wireless connections allowing the users to use their processing devices. Collaboration or presentation systems may require software packages to be downloaded to these processing devices to enable communication using such presentation or collaboration systems. There are various problems that can reduce the efficiency of using such systems. For example, the software packages already on a processing device might be out of date such that the first action is for a processing device to be updated including, possibly, changing the settings and configuring the processing device for specific formats or applications to be used.

IT specialists are often against downloading unfamiliar software onto their networks, that may change the configuration of the processing devices or the characteristics of the content that is being shared. For example, changing a format may create undesirable changes of the presented data.

Currently, matrix-switching systems require a hard-wired or cabled/wired connection to reliably transmit and receive the required bandwidth of data to and from the processing devices that are connected. In addition, accessing and controlling any peripheral devices connected to typical wired matrix-switching systems requires multiple input devices. Currently, no single command and control device can control the data presentation, the matrix-switching and the connected peripheral devices.

While wired connections may be capable of handling a large amount of bandwidth needed to send and receive information between all connected devices in a conferencing environment, corresponding wireless systems do not usually have such a bandwidth. Due to the limited bandwidth capabilities of currently available wireless systems, wireless applications cannot handle the amount of two-way information being sent from hard-wired matrix switches to peripheral computing and multimedia devices. Conventional wireless technology does not support a broadband signal with the necessary bandwidth requirements to send unbuffered and uncompressed collaborative multimedia data without latent pauses, causing disruption of the ideation, communication or sharing of data and information. For example, wireless systems typically achieve transmission rates of 700 Mbps and are not capable of transmission rates greater than 3 Gbps necessary to maintain uncompressed high-definition video conferencing (HDVC).

Wired systems in fixed locations cause installation costs, e.g. to configure and reconfigure a network in a meeting room. Connecting all peripheral devices to a matrix-switching system can require a large amount of wire that can affect the aesthetic look to the meeting room. Such effects are often disruptive and may cause meetings to take longer than necessary.

A meeting room video conferencing system can be exposed to a Unified Communication & Collaboration (UC&C) tool (Like: Teams, Skype, WebEx . . . ) running on a user's laptop through a wireless USB dongle. This allows the remote participant to experience audio and video from the whole room instead of just the person sitting right in front of the laptop. Next to audio/video, there is also a need for both local and remote participants to see the same content (e.g. a PowerPoint presentation) which can be presented as follows:

A first step can be plugging a peripheral device which has a transmitter into the laptop of User A. If user A wants to share content remotely and locally (e.g. a PowerPoint presentation), two actions are required:

Firstly user A must carry out all steps to activate the local sharing of data to be displayed on the meeting room's screen. Then the user must interact with user interface of a UC&C tool to carry out all steps to share remotely the content displayed locally with the remote user B.

Accordingly, at least two separate actions are required to share data to all participants involved in a meeting, i.e. locally and remotely. Computer knowledge is usually required to set up such a system to share locally and remotely, resulting in loss of valuable time or people getting confused in the meeting as to whether the same data is being shared locally and remotely or not.

SUMMARY OF THE INVENTION

The present invention relates to a method, a system and devices for data sharing by teleconferencing with local projection of the same shared data in a local meeting room. The present invention also relates to a method, a system and devices for synchronizing display of content in a local room and remote sharing of the same content as well. The present invention relates to a method, a system and devices for providing access to shared multimedia content within a defined room environment as well as with a remote user.

Embodiments of the present invention provide a method for synchronizing local and remote display of the same content, wherein a local meeting room has a local display screen, and at least one user processing device, the method comprising a client application, running on the user's processing device, detects one or more windows (W1, W2, W3, ...) open on the processing device, and detects that a first window (Wx) of the one or more windows belongs to an application with remote sharing capabilities, the client application monitoring the first window (Wx) of the application with remote sharing capabilities and detects that the application with remote sharing capabilities is sharing a second window (Wy) to a remote video conferencing participant, the client application captures content of the second widow and sends the content of the second window (Wy) to the local display screen.

The client application then preferably keeps monitoring the first window (Wx) to determine when the user stops sharing the second window (Wy) through the application with remote sharing capabilities such as the UC&C tool. Based on this determination, the client application then stops capturing and sending window (Wy) to the local display screen. Other behaviors of other windows can be monitored to determine expected user behavior such as monitoring screen pixels or intercepting API calls. A UC&C tool is an application that allows audio, video and image communication between two or more parties and the sharing of applications or screen content sharing such as computer desktop.

Embodiments of the present invention provide a method for synchronizing local and remote display of the same display content using a processing device, the method comprising:

Searching, most preferably automatically i.e. without user involvement for presence on the processing device of an application with remote sharing capabilities, determining, most preferably automatically i.e., without user involvement if the same or another application with remote sharing capabilities is active on the processing device, determining, most preferably automatically i.e. without user involvement a sharing state of the application with remote sharing capabilities, determining, most preferably automatically i.e. without user involvement if the application with remote sharing capabilities is sharing content with a remote participant, if content is being shared remotely, determining, most preferably automatically i.e. without user involvement if the same content which is being transferred to a remote participant is also being shared with a local display screen, and if the content which is being transferred to a remote participant and shared is not also being shared with the local display screen, the same content is shared, most preferably, automatically i.e. without user involvement to the local display screen as is shared remotely.

In the event that content currently shared remotely is not shared locally, the method can control (preferably automatically) an application allowing sharing content locally such that the remotely shared content is also shared with the local display screen.

This method makes it easier and quicker for content to be shared locally and remotely.

If the content which is being transferred to a remote participant is different from the content being shared with the local display screen, the same content is shared, most preferably automatically i.e. without user involvement to the local display screen as is shared remotely. This makes collaboration between participants more reliable as the same content is viewed remotely and locally.

If the content which is being transferred to a remote participant and shared is different from the content being shared with the local display screen, the method can control (preferably automatically) an application allowing the same content is shared with the local display screen as is shared remotely, and the processing device optionally triggers the application with remote sharing capabilities to share the same content remotely as is shared locally.

The processing device can trigger, most preferably automatically i.e. without user involvement, the application with remote sharing capabilities to share, most preferably automatically i.e. without user involvement the same content remotely as is shared locally. This allows existing applications for sharing to be used, these being triggered, e.g. automatically triggered by a client application.

If it is determined most preferably automatically i.e. without user involvement that some content is being shared with the local display screen but there is no content shared with the remote participant or what is shared with the remote participant is different from what is shared locally, a warning is notified to the local user most preferably automatically i.e. without user involvement that content is being shared locally but not remotely or that different content is being shared. This allows existing applications for sharing to be used, and the warning to participants can allow them to trigger a client application to share content e.g. automatically i.e. without user involvement.

If content is being shared remotely, determining whether the same content which is being transferred to a remote participant is also being shared by a local sharing application to a local display screen, or if sharing content locally is detected, but sharing remotely is not detected, or what is shared with the remote participant is detected as different from what is shared locally, the application with remote sharing capabilities shares the same content remotely as is shared locally.

The warning can be any of or any combination of an audible warning, a pop-up, an optical warning a tactile warning. These warnings are conventional ones and, hence, can be implemented easily.

The application with remote sharing capabilities can be a UC&C application. These can be conventional and, hence, can be implemented easily.

If it is determined, most preferably automatically i.e. without user involvement that content is being shared remotely, it is determined most preferably automatically i.e. without user involvement, whether the same content is being transferred to a remote participant as is being shared by a local sharing application to a local display screen. There are various methods to determine, most preferably automatically i.e. without user involvement whether content is the same such as using OCR to identify text, identifying image objects, e.g. by detecting edges of objects having edges with contrast jumps, or colour jumps, position of objects in the image, etc.

If sharing content locally is detected, most preferably automatically i.e. without user involvement, but sharing remotely is not detected, or what is shared with the remote participant is detected as being different from what is shared locally, the application with remote sharing capabilities shares, most preferably automatically, i.e. without user involvement, the same content remotely as is shared locally. This saves time and does not necessarily require human intervention, i.e. it can be done automatically. Other benefits are that it avoids confusion (i.e., in case human action would not share the same locally and remotely) and IT skills (i.e., the user does not need to know how to do it manually).

The processing device can trigger, most preferably automatically, i.e. without user involvement, the application with remote sharing capabilities to share the same content remotely as is shared locally. This saves time and can avoid human interaction. Other benefits are that it avoids confusion (i.e., in case human action would not share the same locally and remotely) and IT skills (i.e., the user does not need to know how to do it manually).

Embodiments of the present invention provide a system for synchronizing local and remote display of the same display content using a processing device, the system comprising:
  means for searching for presence on the processing device of an application with remote sharing capabilities, most preferably automatically i.e. without user involvement,
  first means for determining, most preferably automatically, i.e., without user involvement, if the same or another application with remote sharing capabilities is active on the processing device,
  second means for determining, most preferably automatically i.e. without user involvement a sharing state of the application with remote sharing capabilities,
  third means for determining, most preferably automatically, i.e. without user involvement, if the application with remote sharing capabilities is sharing content with a remote participant,
  if it is detected that content is being shared remotely, then fourth means are provided for determining, most preferably automatically, i.e. without user involvement, whether the same content which is being transferred to a remote participant is also being shared by a local sharing application to a local display screen, and
  if it is detected that the content which is being transferred to a remote participant and shared is not also being shared with the local display screen, then fifth means are provided for sharing the same content, most preferably automatically, i.e. without user involvement, to the local display screen as is shared remotely.

This system makes it easier and quicker for content to be shared locally and remotely.

If it is detected that the content which is being transferred to a remote participant and shared is different from the content being shared with the local display screen, then means are provided to share, most preferably automatically, i.e. without user involvement, the same content to the local display screen as is shared remotely. This can save time. It can also be carried out automatically. Other benefits are that it avoids confusion (i.e., in case human action would not share the same locally and remotely) and IT skills (i.e., the user does not need to know how to do it manually).

The processing device is preferably adapted to trigger, most preferably automatically i.e. without user involvement the application with remote sharing capabilities to share, most preferably automatically, i.e. without user involvement, the same content remotely as is shared locally. This can save time. It can be carried out automatically without human involvement. Other benefits are that it avoids confusion (i.e., in case human action would not share the same locally and remotely) and IT skills (i.e., the user does not need to know how to do it manually).

If it is determined that some content is being shared with the local display screen but there is no content shared with the remote participant or what is shared with the remote participant is different from what is shared locally, means are provided to notify, most preferably automatically i.e. without user involvement a warning to a local user that content is being shared locally but not remotely. This can save time. It can be carried out automatically. Other benefits are that it avoids confusion (i.e., in case human action would not share the same locally and remotely) and IT skills (i.e., the user does not need to know how to do it manually).

The warning can be any of or any combination of an audible warning, a pop-up, an optical warning a tactile warning. These are conventional warnings and can be implemented easily. The application with remote sharing capabilities can be a UC&C application. Existing applications can be used which save time and costs.

If it is detected that content is being shared remotely, determining, most preferably automatically i.e. without user involvement whether the same content is being transferred to a remote participant as is being shared by a local sharing application to a local display screen. This can save time. It can be carried out automatically, that is without human involvement. Other benefits are that it avoids confusion (i.e., in case human action would not share the same locally and remotely) and IT skills (i.e., the user does not need to know how to do it manually).

If it is detected that sharing content locally is detected, most preferably automatically i.e. without user involvement, but sharing remotely is not detected, or what is shared with the remote participant is detected, most preferably automatically i.e. without user involvement as being different from what is shared locally, the application with remote sharing capabilities shares the same content remotely as is shared locally, most preferably automatically i.e. without user involvement. This can save time. It can be carried out automatically. Other benefits are that it avoids confusion (i.e., in case human action would not share the same locally and remotely) and IT skills (i.e., the user does not need to know how to do it manually).

The processing device can trigger, most preferably automatically, i.e. without user involvement, the application with remote sharing capabilities to share the same content remotely as is shared locally. This can save time. It can also be carried out automatically. Other benefits are that it avoids confusion (i.e., in case human action would not share the same locally and remotely) and IT skills (i.e., the user does not need to know how to do it manually).

A computer program product can be provided that, when executed on a processor of a processing device, executes any of the methods of the present invention. A non-transitory signal storage medium can be used to store the computer program product. The non-transitory signal storage medium can be, for example, an optical disk (CD-ROM or DVD-ROM), a digital magnetic tape, a magnetic disk, a solid state memory such as a USB flash memory, a ROM, etc.

Definitions

"Automatic operation" can comprise automatic control (i.e. without user involvement) of computer or network elements such as a processor or processors, memory or memories, e.g. RAM, non-volatile memory or memories, solid state memory or memories, internal or external memories, a device or devices, an application or applications, an application interface or application interfaces, an I/O interface or I/O interfaces e.g. for communications via networks. Automatic operation includes detecting status or presence of applications running on an operating system.

"Remote Conferencing" Such as "Remote Video Conferencing"

Remote conferencing refers to various types of online collaborative services including web seminars ("webinars"), webcasts, peer-level web meetings, and other collaborative sessions. Such conferencing can use Internet technologies, such as TCP/IP connections. They can provide real-time point-to-point communications as well as multicast communications from one sender to many receivers. It can offer data streams of text-based messages, voice, audio, or video to be shared simultaneously, across geographically dispersed locations.

"Local Display" and "Local Device"

Local displays and local devices are physically present in the local meeting room which also has one or more processing devices with which visual and/or audible content can be shared. A local sharing device, such as a Wireless Presentation System, is a receiver part, which receives content from a Local Sharing Sender, e.g. via a wireless or wired network, and displays this on a room display or a local display. A local Sharing Device can be a separate device connected to a room display or a local display or can be a function integrated in the local room display.

"Local Sharing Client"

A software application, running on a processing device in a meeting room, that allows to share content to a local display.

An "Application with remote sharing capabilities UC&C App 15" is a software application, for running on a processing device, that allows the user to have an audio and/or video communication with one or more remote parties. It preferably allows audio, video and/or image communication between two or more parties and the sharing of applications or screen content sharing such as computer desktop.

Examples are Teams, Skype, Lync, Zoom, Webex. Most of this kind of tool also allow sharing content with the remote party. The content is typically one of the following: a specific window, a region of the screen, the full screen, a file (e.g. a Powerpoint file) or network collaborative content (e.g. file on OneDrive, Networked WhiteBoard application, . . . ) (see, for example, US patent applications US2005172080 and US2013268849 and Chinese patent application CN105491156 (FIG. 1), each of which is incorporated herein by reference).

"Unified communication tool" or "Unified Communications system or tools" or "Unified Communication and Collaboration (UC&C)" refers to audio or audio visual communications such as provided by "Skype™" or "Skype™ for business". Such software can take over audio and/or visual data provided from a host processing device.

A UC&C can be described as a collection of tools to do VOIP, (web) conferencing, shared whiteboarding, message exchange (e.g. chat), file transfer, or presence. Unified Communications system or tools can make use of a protocol- or standard defined or specific communication session or interaction, such as Voice-Over-Internet-Protocol (VOIP), text or instant messaging (e.g., AIM, Blauk, eBuddy, Gadu-Gadu, IBM Lotus Sametime, ICQ, iMessage, IMVU, Lync, MXit, Paltalk, Skype™, Tencent QQ, Windows Live Messenger™ or MSN Messenger™, Wireclub, Xfire, and, Twitter (e.g., tweeting), Digital Service Protocol (DSP), and the like. Unified Communications systems or tools can make use of video conferencing cloud service, including a video conferencing node to allow one or more users located at the first video conferencing endpoint to communicate with one or more users located at the second video conferencing endpoint in a video conference.

Processing Device

A processing device has one or more processors for digital electronic processing and memory and operating system for running one or more client applications. It can have input/output interfaces to allow communication with one or more types of network such as wireless or wired networks. It can have input/output connections to allow connection o one or more types of network such as wireless or wired networks. It can have a desktop.

'BYOD' Device—(Bring Your Own Device)

A 'BYOD' (Bring Your Own Device) device can be brought into a meeting room by a user. Such a device can be, for example, a computer, a laptop, mobile phone, a smart phone, a tablet, a PDA, etc. Such a device has non-volatile storage, processor, memory, display, networking interface, etc.

Desktop

A desktop is what the display screen of a processing device displays after logging on. The desktop is typically a folder that holds files and folders the content of which remains on screen in the background at all times. The desktop can also include menus and icons for launching applications and managing a processing device.

Windows

Windows are graphical control elements containing a graphical user interface of an application running on the processing device. An application can have zero (such as a background process) or one or more windows on the desktop. Windows are graphical control elements containing the graphical user interface of an application running on the processing device. An application can have zero ('background process') or one or more windows on the desktop.

See for example: https://en.wikipedia.org/wiki/Window_(computing).

Same Content

There are various methods to determine whether content in two files is the same, such as using OCR to identify a common text, identifying image objects e.g. by detecting edges of objects having edges with contrast jumps, or colour jumps, or correlating positions of objects in two different images, etc.

DETAILED DESCRIPTION

Embodiments of the present invention allow a wireless connection between a user processing device such as a laptop, computer, PDA, smartphone etc. and a base station or unit of a wireless network in a local meeting room as well as allowing remote sharing with a remote participant. The wireless connection may be made by an integrated wireless transceiver in the user processing device such as the laptop, the computer, the PDA, or the smartphone etc. Alternatively, in some embodiments of the present invention the wireless connection is made via a peripheral device plugged into, coupled, connected or attached in some way to the user processing device or is provided by other hardware or software.

Figure 1:
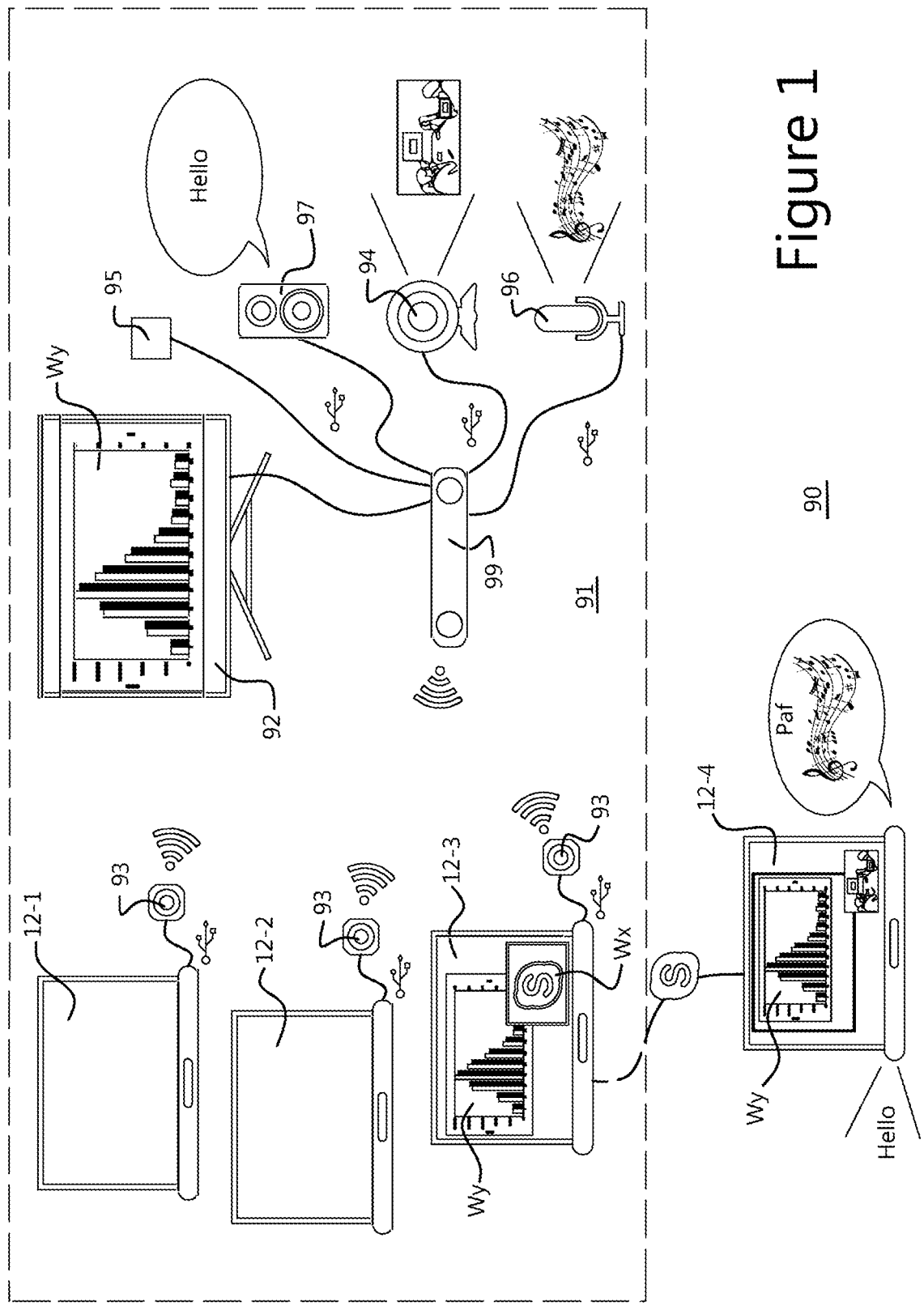
FIG. 1 shows an arrangement of processing devices as used in a meeting with a unified communication in progress according to an embodiment of the present invention.

FIG. 1 shows an embodiment of the present invention with which local sharing and remote sharing are kept in sync, most preferably automatically i.e. without user involvement in case other meeting participants having a number of processing devices like 12-1 to 12-3 are in the meeting room and share to the local screen 92. Embodiments of the present invention allow a participant to use a processing device like 12-3 and this can be adapted to share its own content both locally and remotely, most preferably automatically i.e. without user involvement. In particular, embodiments of the present invention can trigger, most preferably automatically i.e. without user involvement sharing from local to the application with remote sharing capabilities such as UC&C and/or triggering, most preferably automatically i.e. without user involvement sharing from the application with remote sharing capabilities such as UC&C to local.

FIG. 1 shows a meeting room comprising a plurality of processing devices 12-1 to 12-3, a display screen 92 or a display device (not shown) connected with a display screen 92 for use with embodiments of the present invention, wherein processing device 12-3 is sharing content, e.g. with processing device 12-4. Processing device 12-4 is at a remote location 90 and can be communicating with processing device 12-3 and sharing content either in one direction or bi-directionally. Embodiments of the present invention can optionally trigger, most preferably automatically i.e. without user involvement sharing from local to an application with remote sharing capabilities such as to a UC&C. The sharing of content can be either in one direction or bi-directionally. Embodiments of the present invention can trigger, most preferably automatically i.e. without user involvement sharing from an application with remote sharing capabilities such as UC to local. The present invention solves the problem created by a person using processing device 12-3 wanting to share own content both locally and remotely with other processing devices.

FIG. 1 shows a meeting involving multiple participants, each with one of four processing devices 12 (12-1, 12-2, 12-3, 12-4) which can be laptops, for example. Optionally, a number of, such as three of the processing devices (12-1, 12-2, 12-3), can each be connected to a first peripheral device 93, e.g. by inserting the first peripheral device 93 in a connection on the processing device such as a USB or HDMI connection, e.g. one for each processing device. Alternatively, a connection device integral with one or more of the processing devices (12-1, 12-2, 12-3) such as an on-board wireless connection can be used; for example, making a WiFi connection using an on-board transceiver.

One processing device 12-3 can be the host of a call of an application with remote sharing capabilities such as a UC&C Unified Communication (UC) call such as a Skype call or a Skype for Business call. Processing device 12-4 is a processing device of a remote participant in the call; but is not necessarily the host device. Inside the meeting room 91, processing device 12-3 is in a call with processing device 12-4 in a remote location 90.

The optional first peripheral devices 93 (or other connection means) of two of the processing devices (e.g. 12-1, 12-2) have completed a wireless connection such as a WiFi connection, e.g. using an on-board transceiver, for example, with a base station 99 and are sharing media to the main display screen 92. The processing devices 12-3 and 12-4 are sharing the call of the application with remote sharing capabilities such as the UC&C Unified Communication (UC) call, such as the Skype call or a Skype for Business call.

Connected to the base station 99 is or are any of the following (non-exhaustive list):

A Webcam or camera 94, e.g. connected through a suitable connection such as a USB or HDMI connection with the base station 99, a display screen e.g. a touch screen 92, a speakerphone such as a USB speakerphone 95, a microphone such as a USB microphone 96 and/or a speaker set 97 (e.g. connected through an audio jack, s/pdif, USB, HDMI, etc.).

Embodiments of the present invention relate to an amendment of the host processing device 12-3 (i.e. a processing device inside the meeting room operating as a host), to improve setting up remote and local display of the same media content, most preferably automatically i.e. without user involvement. The host processing device 12-3 preferably has pre-installed client software for executing an application with remote sharing capabilities such as the UC&C client software. Alternatively, the host processing device 12-3 may have a launcher application which launches, on activation, a program to download an application comprising software with remote sharing capabilities from a server or website or from the base station 99. Alternatively, the host processing device 12-3 obtains the application comprising software from storage, e.g. from a CD-ROM or flash drive, a magnetic tape, solid state memory, etc.

This software interacts with endpoints such as USB endpoints on the optional first peripheral device 93 connected to, e.g. plugged into, the host processing device 12-3. This type of client software will use speakerphone endpoints, such as USB endpoints, as a default audio device (e.g. microphone plus speaker). Embodiments of the present invention are in control of all audio or visual signals emitted from and injected in the processing device 12-3, most preferably automatically, i.e. without user involvement.

The speakerphone 95 can be used by any of the participants, for example those having a first peripheral device 93 connected to a processing device and functioning. There is no need to perform an action to get access to this device. Embodiments of the present invention include separate controls made available on the first peripheral device 93, for example to control the volume of the audio output of the base station 99 and to mute the room microphone 96 if necessary. When muted, the microphone 96 is also muted for all other peripheral devices or apps using this device.

The software for the application with remote sharing capabilities, such as the UC&C client software running on the host processing device 12-3, need not inject the audio content. The microphone 96 can pick up this audio signal, or the base station 99 can inject it in the microphone signal to the first peripheral device 93 connected to the host processing device 12-3. Optionally, there is no need for lip-sync with the content video (even if sharing) as the latency is low.

A same type of second peripheral device (not shown) can be exposed to a user as it is plugged into the base station 99 so that the user can use the drivers provided on the base station, such as from a vendor.

If one of the processing devices 12 is sharing in the room 91, the audio content is preferably shared in the room 91 too.

Any processing device 12, e.g. with on-board wireless communications or with a functioning first peripheral device 93 can, for example, access the room camera 94 wirelessly. All other devices connected to the base station 99 (e.g. HID control devices) will or can be exposed natively.

Any user connected to the system, e.g. optionally through a first peripheral device 93, has the ability to view the content that is projected in the meeting room 91 on a display of the user's processing device 12, i.e. "local view". The receiver of the local view can have, but is not limited to, one some or all of the following functionality:

The ability to open a window and view the meeting room content in that window independently of whether it is the stream itself, the annotation or a blackboard session.

The ability to zoom into the content.

Additional measures to assure the picture quality when zooming in, can be added to the feature.

The local view could allow the user to start and/or participate in a blackboard or annotation session from his/her own device.

The ability to take screenshots and/or pause the local view.

In accordance with embodiments of the present invention, a local meeting room 91 has a local display screen 92. Inside the local meeting room 91 there is at least one user with a user processing device 12. This processing device 12 can be a 'BYOD' (Bring Your Own Device) brought by a user into the meeting room 91.

Figure 2:
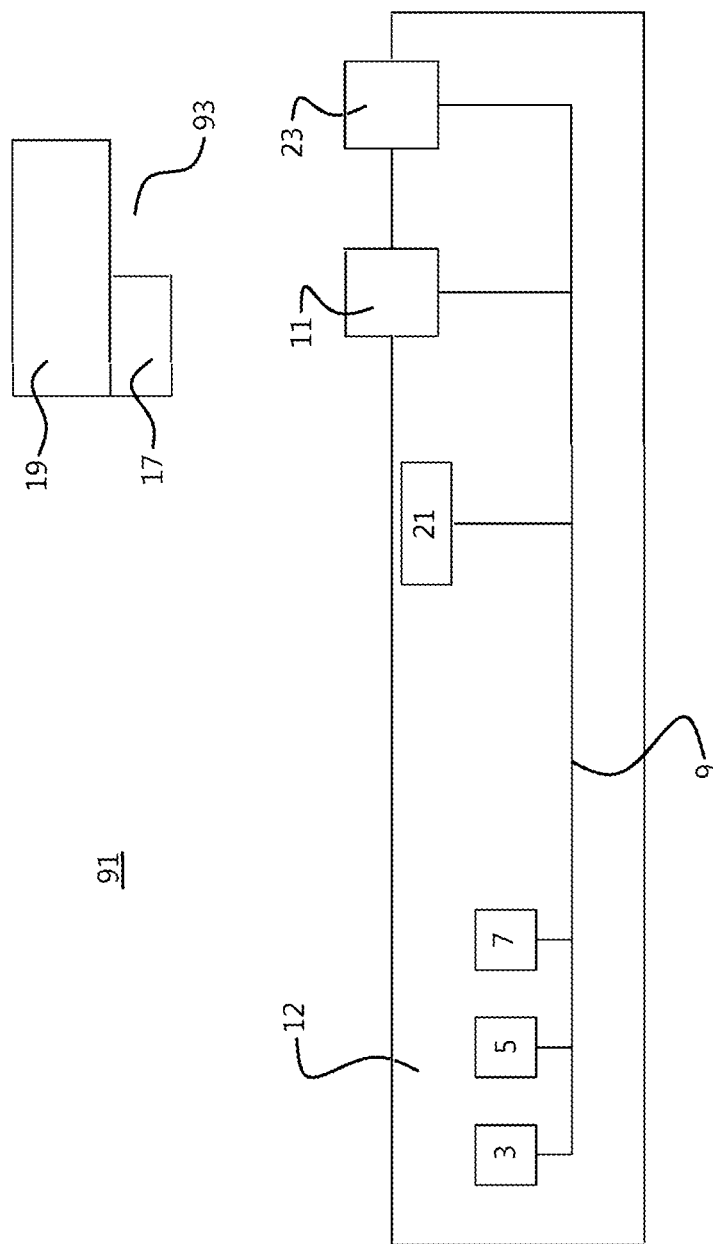
FIG. 2 shows a meeting room with a processing device according to an embodiment of the present invention.

FIG. 2 shows such a meeting room 91 schematically with at least one processing device 12. The processing device 12 can have a processor 3, random access memory 5, non-volatile memory 7 which can be a hard drive or a solid-state memory, for example. The processor can have an operating system. Processing device 12 can have several ports with associated input and/or output ports and communication interfaces such as:

a cable connection 21 for communication with a local area network (not shown) and/or for communication with a display screen in the room or and/or for communication with a display device connected to the display screen, and/or a wireless connection 23 and/or a serial connection 11 such as a USB connection 11, one some or all of which can be for communication with
a display screen in the room or and/or for communication with a display device connected to the display screen. The processor 3, random access memory (RAM) 5, non-volatile memory 7, input and/or output ports such as a cable connection 21 for communication with a local area network (not shown), such as a wireless connection 23 and a serial connection 11 such as a USB connection 11, can all be linked by a bus system 9.

A peripheral device 93 can have a connection 17 such as a serial connection of which a USB connection is one example, a transceiver 19 or a transmitter and a receiver. Connection 17 can be inserted in port 11 of the processing device 12 to provide a USB serial connection.

Figure 3:
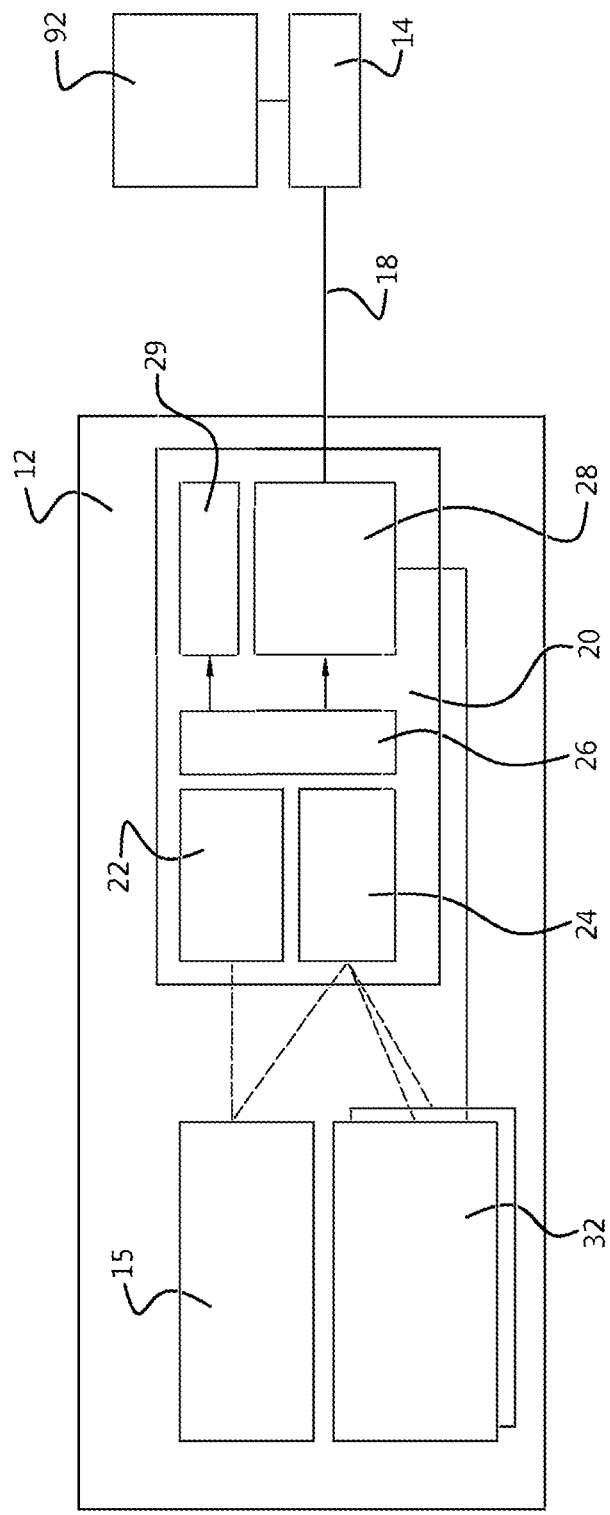
FIG. 3 shows a processing device according to an embodiment of the present invention.

FIG. 3 shows a further embodiment of the present invention. In accordance with an embodiment of the present invention, a client application, running on the user processing device 12-3, detects (preferably automatically) one or more windows [W1, W2, W3 . . . ] open on the processing device 12-3, such as on the desktop of the processing device 12-3. The client application detects (preferably automatically) that a certain window such as Wx belongs to an application with remote sharing capabilities, such as a UC&C tool, on processing device 12-3. By monitoring (preferably automatically) this window Wx on processing device 12-3 of the application with remote sharing capabilities, such as the UC&C tool, the sharing status can be determined (preferably automatically). For other behaviors of other windows, such as at least window Wy, the client application running on processing device 12-3 detects (preferably automatically) that the application with remote sharing capabilities such as the UC&C tool is sharing a window Wy to a remote audio, visual or video conferencing participant at a remote location 90. The client application running on processing device 12-3 then captures (preferably automatically) and sends (preferably automatically) the same window Wy to the local display screen 92, optionally via a display device 14 and a network 18. The client application then keeps monitoring window Wx to determine (preferably automatically) when the user stops sharing window Wy through the application with remote sharing capabilities such as the UC&C tool.

Optionally, Wy can be implicitly unshared from Wx or explicitly unshared by closing Wx itself (preferably automatically). The client application can detect the unsharing action (preferably automatically). The client application can then stop the capturing (preferably automatically) and also stop the sending (preferably automatically) of window Wy to the local display screen 92.

Local Sharing Client (20)

A Local Sharing Client 20 is a software application, running on a processor of an operating system of processing device 12 in a meeting room, that allows to share content to a local display 92. This sharing can happen directly from the local sharing client 20 over a network 18 to the local display 92, or over a network 18 to a display device such as a wireless presentation device 14 connected to the local display 92, or from the client to a wireless presentation peripheral device (such as a USB/HDMI-dongle) to a wireless presentation device 14. The wireless presentation peripheral device can be connected or coupled to the processing device 12, e.g. by insertion into a connection port such as a USB or HDMI port on processing device 12.

Client application 20 is an application, which comprises software blocks 22, 24, 26, 28 and 29 as will be described below with reference to FIG. 3. Hence, the local sharing client 20 can comprise the following software blocks:

UC&C App Detection Mechanism (22)

This software block 22, which is part of the client application 20 that runs on the processing device 12, can detect (preferably automatically) the presence of an application with remote sharing capabilities such as a UC&C Application 15 running on the processing device 12. There are different ways in which this can be done, each of which is an embodiment of the present invention. The software block 20 comprising software block 22 can carry out one, some or all of the following:

First of all, a request can be made (preferably automatically) by the software block 22 being part of the client application 20 for obtaining a list of open windows from the operating system of the processing device 12. For example, the software block 22, running on the processing device 12, detects (preferably automatically) windows [W1, W2, W3 . . . ] open on the desktop of the processing device 12.

Then, the software block 22 examines this list of windows (preferably automatically) to determine whether one of the windows comprises an indicator such as a text string like, for example, a title that contains a certain text string. Such a text string may indicate a known application with remote sharing capabilities, e.g. includes a known UC&C Application title.

Alternatively, the software block 22 can make a request (preferably automatically) for the list of running processes from the operating system of the processing device 12 and determines (preferably automatically) whether any of the process' names matches with a known text string, e.g. of a known application with remote sharing capabilities such as a known UC&C Application process name.

A further method is for the software block 22 to capture data (preferably automatically) on the display screen of the processing device 12 and to apply OCR or image recognition techniques to detect (preferably automatically) the presence of a certain text string, e.g. a name of a known application with remote sharing capabilities such as a name of a known UC&C Application 15.

Using the methods described above software block 22 being part of software block 20 detects (preferably automatically) that window Wx belongs to a known application with remote sharing capabilities such as a UC&C tool. The software block 22 can look (preferably automatically) at a name of a window or associated process, for example, and match (preferably automatically) with a known application with remote sharing capabilities such as a known UC&C name (e.g. Skype™ for Business, Microsoft Teams . . . ).

Yet a further method is for the software block 22 to monitor (preferably automatically) the behavior of one or more processes on the processing device 12 and to determine (preferably automatically) a fingerprint-behavior which corresponds to a known application with remote sharing capabilities such as a known UC&C Application 15.
UC&C Behaviour Detection Mechanism (24)

For example, a software block 24 is adapted to detect (preferably automatically) a behaviour of a known application with remote sharing capabilities such as a UC&C Application 15. There are different ways in which it can do this, each of which is an embodiment of the present invention. The software block 24 can carry out one, some or all of the following (preferably automatically):

A request can be made (preferably automatically) for a list of open windows from the operating system of the processing device 12 by software block 22 or by the software block 24. Independent of how the list has been obtained, the software block 24 can monitor (preferably automatically) the behavior of these windows while the user is working in a known application with remote sharing capabilities such as a UC&C Application 15. For example, the software block 24 can determine (preferably automatically) whether a window in the list of open windows suddenly becomes in-focus when the user clicks on the known application with remote sharing capabilities such as the UC&C Application 15.

A request can be made (preferably automatically) by software block 22 or by the software block 24 for the list. Independently of how the list has been obtained, the software block 24 can determine (preferably automatically) whether the known application with remote sharing capabilities such as a UC&C App 15 created a window around another window, indicating it is capturing that window.

The software block 24 can capture (preferably automatically) the screen of the processing device and apply OCR or image recognition techniques to detect whether the known application with remote sharing capabilities, such as the UC&C App 15, has started capturing another window, e.g. it can look for a rectangle (preferably automatically) being drawn around another window or text clues inside the user interface of the UC&C App 15.

The software block 24 can be adapted to predict (preferably automatically) what the user might be interested in sharing. For example, the software block 24 can monitor (preferably automatically) a pointer interaction such as a "mouse" interaction. For example, a tooltip on a hovering widget, or a state update over the clicked widget can be determined to predict what the user might be interested in sharing (preferably automatically).

Accordingly, by monitoring (preferably automatically) window Wx of the known application with remote sharing capabilities such as the UC&C tool, the client application 24 detects (preferably automatically) that the known application with remote sharing capabilities, such as the UC&C tool, is sharing a certain window Wy to a remote processing device 12-4 of a video conferencing participant. Monitoring (preferably automatically) the window's state, e.g. window creation/destruction, focused/unfocused, can be used to predict a users' behavior. For instance, in the application Teams™ (Microsoft) when there is an attempt to share a window, the tool will bring the selected window to the foreground and will then create another sharing indicator 'border Window' on top. Thus, this sharing indicator informs that a specific window is being shared with a remote participant.

An alternative is to capture (preferably automatically) the screen and to use Artificial Intelligence, including machine learning, to analyse whether an unknown application with remote sharing capabilities, such as an unknown UC&C tool, is sharing a window and if so, to find out which window and its content.
Local Sharing Sender Client Application (28)

The software block 28 can send (preferably automatically) content from the processing device 12 to the local room display 92. For example, it can use a networking interface of the processing device 12 (preferably automatically) to send the data to the local room display 92 or can make use of an additional peripheral device 93 (preferably automatically), such as a USB peripheral device inserted in a USB port of the processing device 12. The peripheral device 93 can have a transmitter or transceiver 19 (FIG. 2) to transmit the content to the local room display 92 e.g. via a local sharing device 14 and a network 18 to do this (preferably automatically).
User Notification Software (29)

This software block 29 is able to send (preferably automatically) notifications to the user. A notification can be any way of informing a user of an event such as one or more of the following:

A popup message on the screen of the processing device.

An audio clue or message.

A change in color of an optical indicator on a peripheral device connected to the processing device or a change in colour or optical pattern on the display screen of the processing device.

A tactile message.
Sharing/Unsharing Predictor and Synchronizer (26)

This software block 26 can (preferably automatically) combine and/or synchronise a known application with remote sharing capabilities having a detection mechanism such as a UC&C App Detection Mechanism 22 as well as behavior detection mechanism such as a UC&C behaviour Detection Mechanism 24 with the local sharing status to decide on a synchronization action (preferably automatically).

Both applications providing a detection mechanism (operating preferably automatically) such as for the application with remote sharing capabilities, such as a UC&C App 15, i.e. a UC&C Detection Mechanism 22 as well as a behavior detection mechanism for the application with remote sharing capabilities, such as a UC&C App 15, i.e. a UC&C behaviour Detection Mechanism 24 are preferred or needed in order to achieve synchronization of local with remote. Software block 22 detects (preferably automatically) the presence of an application with remote sharing capabilities, such as a UC&C App 15, while software block 24 monitors (preferably automatically) the state of the application with remote sharing capabilities such as a UC&C App 15.

The action can be one or both of the following:

If the known application with remote sharing capabilities, such as a UC&C App 15, is sharing some content (detected preferably automatically) which a Local Sharing Sender 28 is not sharing, this is a trigger for the Local Sharing Sender 28 to share the same content (preferably automatically), e.g. with a local sharing device 14 to project onto a local room display 92.

If the Local Sharing Sender 28 is sharing content (preferably automatically) which the known application with remote sharing capabilities such as a UC&C App 15 is not sharing, then an action is carried out (preferably automatically). This action can be to notify the user about this using a User Notifications software block 29. For example, a warning can be notified (preferably automatically). Alternatively, the action can be to trigger (preferably automatically) the known application with remote sharing capabilities, such as the UC&C App 15, to share (preferably automatically) the same content with a remote participant if the known application with remote sharing capabilities such as the UC&C App 15 has means to perform this action programmatically (and preferably automatically). Alternatively, a trigger for the application with remote sharing capabilities, such as a UC&C App 15, can be provided by other means (preferably automatically), such as simulating events such as simulating keyboard or mouse events or similar. Alternatively, the trigger can be provided (preferably automatically) through a system API (e.g. operating system events) such as Window's PostMessages.

When a client application starts sharing "locally", known applications with remote sharing capabilities, such as an existing UC&C tool 15, are monitored (preferably automatically) for their presence in the operating system of the processing device 12. If the client software finds (preferably automatically) a known application with remote sharing capabilities such as a UC&C tool 15, a quick access shortcut informs (preferably automatically) the user through the User notifications block 29. When the user clicks on the shortcut, the client application will automatically bring the selected tool to the foreground to allow the user to start sharing "remotely" in an efficient manner.

Other Windows W1, . . . . Wn, . . . (32) on the System

This is the list of windows available on the operating system of the processing device 12. A single application can have multiple active windows. For example, during a presentation, Powerpoint™ can have both a window showing the presentation and a window containing the notes for the presenter.

Room Display (92) and Local Sharing Device (14)

These devices 14 and 92 are physically present in the local room 91 with the processing device 12 with which visual and/or audible content can be shared. The local sharing device 14 (such as a Wireless Presentation System) is a receiver part, which receives content (preferably automatically) from the Local Sharing Sender 28 (e.g., via a wireless or wired network 18) and displays this on the room display 92. The Local Sharing Device 14 can be a separate device connected to a room display 92 or can be a function integrated in the room display 92.

Ambiguous Sharing Protection

It is possible, that one or some or all of windows Wy shared via window Wx can fulfill 100% prediction accuracy, as success of the prediction accuracy can depend on the "behavior sampling rate" and which "inputs" can be retrieved from the window Wx and window Wy in order to feed into a predication model. In such a case, the detection logic might meet an ambiguous decision. To solve this problem, the client application can automatically show a quick window sharing shortcut though the User notifications block 29 to let a user intervene and resolve the ambiguous decision.

Figure 4:
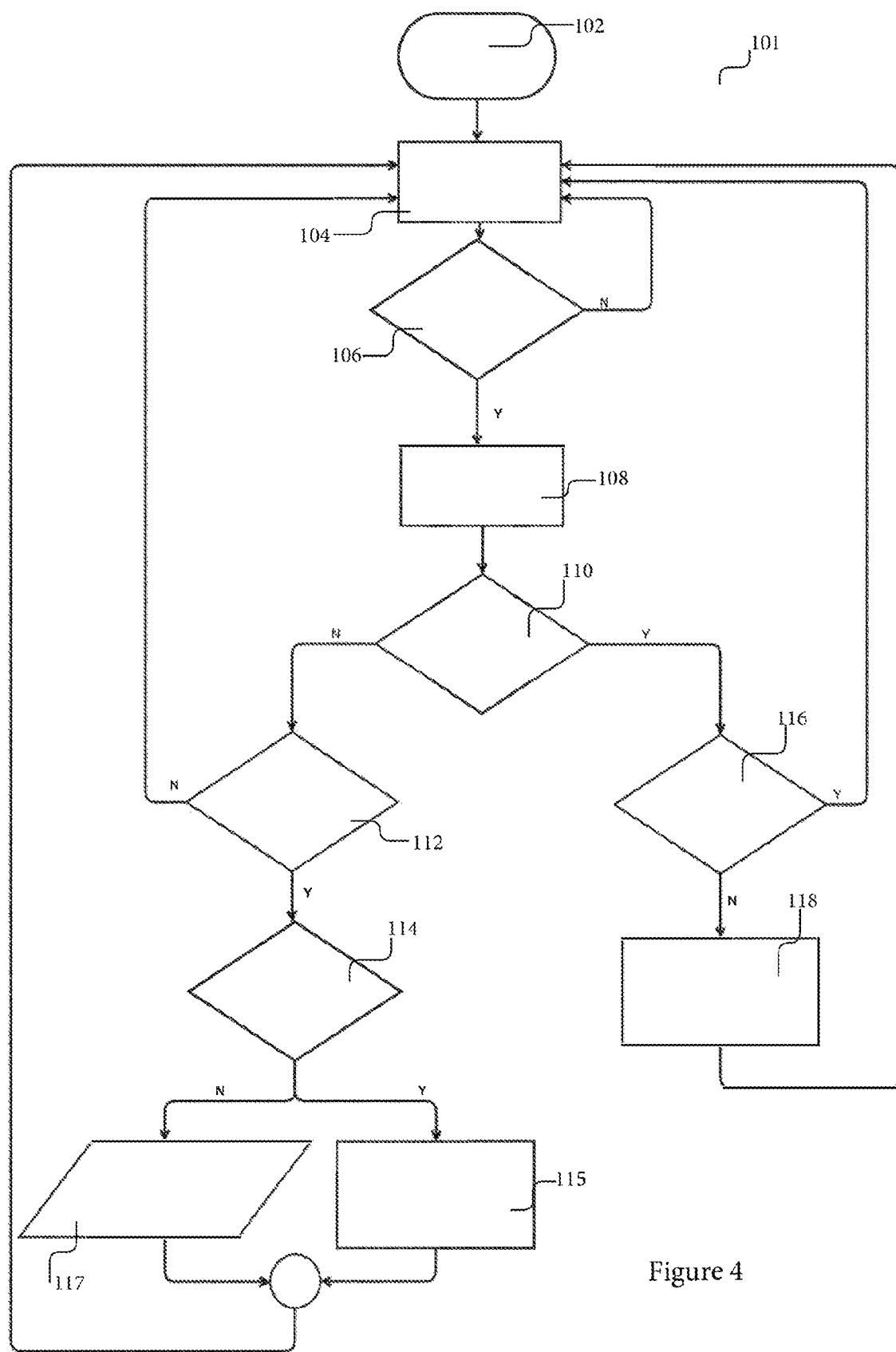
FIG. 4 shows a message flow according to an embodiment of the present invention.

FIG. 4 shows a flow diagram of a method 101 according to an embodiment of the present invention. In step 102 a local sharing application is launched (preferably automatically), e.g. on a local processing device 12, which device is in a local meeting room 91, the local sharing application making use of the operating system running on the processor 3 of a local processing device 12 plus memory 5, 7 as required. In step 104 the search is started (preferably automatically) by a client application for the presence of an application with remote sharing capabilities, such as a UC&C application, on the processing device. The client application makes use of the operating system running on the processor 3 of a local processing device 12 plus memory 5, 7 as required. This method step is preferably carried out continuously or intermittently on the processing device 12 using the operating system running on the processor 3 of the processing device 12 plus memory 5, 7 as required, and with a significant probability that the presence will be detected within a reasonable time such as less than 5 minutes. In step 106 it is determined (preferably automatically), using a client application running on the operating system using the processor 3 of the processing device 12 and making use of memory 5, 7 as required, whether an application with remote sharing capabilities, such as a UC&C application, is active on the processing device 12. If NO in step 106 then the method 101 returns to step 104 to try again. The method 101 will go through the sequence of steps 104 and 106 repetitively and continuously until an application with remote sharing capabilities, such as a UC&C application, is found to be active. If YES in step 106 the method 101 passes to step 108 in which the sharing state of the application with remote sharing capabilities, such as the UC&C application, is determined (preferably automatically). This can be determined (preferably automatically), for example, using a client application running on the operating system of the processor 3 of the processing device 12 and making use of memory as required. In step 110 it is determined (preferably automatically) by a client application running on the operating system of the processor 3 of the processing device 12 making use of memory as required, whether the application with remote sharing capabilities, such as the UC&C application, is sharing content with a remote participant. If YES in step 110, it is determined in step 116 (preferably automatically) by a client application running on the operating system of the processor 3 of the processing device 12 making use of memory 5, 7 as required, whether the same content which is being transferred to a remote participant is also being shared by a local sharing application to the local display screen 92 and, optionally, to a local sharing device which displays the content on the local display screen 92. If NO in step 116, a local sharing application running on the operating system of the processor 3 of the processing device 12 and using memory 5, 7 as required, shares the same content in step 118 as is shared with the remote participant to the local display screen 92 and, optionally, to a local sharing device which displays the content on the local display screen 92. This sharing can be triggered (preferably automatically) by a client application running on the operating system of the processor of the processing device. The method 101 then returns to step 104. Alternatively, if NO in step 116, a warning is notified to the local user in step 118

(preferably automatically) that content is being shared locally but not remotely or that different content is being shared. The warning can be any of or any combination of an audible warning, a pop-up, and optical warning a tactile warning. The method 101 then returns to step 104. If YES in step 116, the method 101 returns to step 104.

If NO in step 110, a local sharing application running on the operating system of the processor 3 of the processing device 12 and using memory 5, 7 as required, determines (preferably automatically) in step 112 whether any content is being shared by the application with remote sharing capabilities, such as the UC&C application, e.g. by the processing device 12 to the local display screen or to a local display device which displays the content on the local display screen 92. If YES in step 112, it is determined in step 114 (preferably automatically) whether the sharing status of the application with remote sharing capabilities, such as the UC&C application, can be changed by the local sharing application. If YES in step 114, in step 115 a local sharing application running on the operating system of the processor 3 of the processing device 12 and using memory 5, 7 as required, shares the same content as is shared with the remote participant to the local display screen 92 and optionally to a local sharing device which displays the content on the local display screen 92. This sharing can be triggered by a client application running on the operating system of the processor 3 of the processing device 12. The method 101 then returns to step 104.

If NO in step 114, in step 115 a warning is notified in step 117 to the local user (preferably automatically) that content is being shared locally but not remotely and the method returns to step 104. The warning can be any of or any combination of an audible warning, a pop-up, and optical warning a tactile warning. If no in step 112, the method 101 then returns to step 104.

An embodiment of the resent invention relates to a system for synchronizing local and remote display of the same display content using a processing device. The system can comprise means for searching (preferably automatically) for presence on the processing device of an application with remote sharing capabilities such as provided by a processing device with a processor and an operating system being adapted to search for presence on the processing device of an application with remote sharing capabilities. The system may comprise first means for determining (preferably automatically) whether an application with remote sharing capabilities is active on the processing device, such as provided by a processing device with a processor and an operating system being adapted to determine whether an application with remote sharing capabilities is active on the processing device. The system may include second means for determining (preferably automatically) a sharing state of the application with remote sharing capabilities, such as provided by a processing device with a processor and an operating system being adapted to determine a sharing state of the application with remote sharing capabilities. The system may include third means for determining (preferably automatically) whether the application with remote sharing capabilities is sharing content with a remote participant, such as provided by a processing device with a processor and an operating system being adapted to determine a sharing state of the application with remote sharing capabilities. The system may be adapted such that if it is detected that content is being shared remotely (preferably automatically), fourth means are provided for determining (preferably automatically) whether the same content which is being transferred to a remote participant is also being shared by a local sharing application to a local display screen such as provided by a processing device with a processor and an operating system being adapted to determine whether the same content, which is being transferred to a remote participant, is also being shared by a local sharing application to a local display screen. The system may be adapted so that, if it is determined (preferably automatically) that the content which is being transferred to a remote participant and shared, is not also being shared with the local display screen, means for sharing the same content to the local display screen as is shared remotely are provided such as provided by a processing device with a processor and an operating system being adapted to share the same content which is being transferred to a remote participant to a local display screen using a local sharing application. The system can be adapted, so that if it is detected (preferably automatically) that the content which is being transferred to a remote participant and shared is different from the content being shared with the local display screen, then means are provided to share (preferably automatically) the same content to the local display screen as is shared remotely. The system can be adapted so that if it is determined (preferably automatically) that some content is being shared with the local display screen but there is no content shared with the remote participant or what is shared with the remote participant is different from what is shared locally, means are provided to notify (preferably automatically) a warning a local user that content is being shared locally but not remotely. The warning can be any of or all of an audible warning (such alarm noise), or a tactile (e.g., vibrating), visual (e.g. change of pattern or colour), optical (e.g. change of intensity, flashing lights) or similar.

The system can be adapted such that if content is being shared remotely, means are provided for determining (preferably automatically) whether the same content which is being transferred to a remote participant is also being shared by a local sharing application to a local display screen.

Implementation

In accordance with embodiments of the present invention, software may be implemented as a computer program product which has been compiled for a processing engine to carry out any of the methods of the present invention or which has been compiled to execute in an interpretative virtual machine such as the Java™ Virtual Machine. A number or all of software components can be stored in the memory and are executable by the processor 3 in a processing device 12. The term "executable" means a program file that is in a form that can ultimately be run by the processor 3. Examples of executable programs may be, for example, a compiled program that can be translated into machine code in a format that can be loaded into a random access memory 5 and run by the processor 3, or source code that may be expressed in proper format such as object code that is capable of being loaded into a random access memory 5 and executed by the processor 3, or source code that may be interpreted by another executable program to generate instructions in a random access memory 5 to be executed by the processor 3, etc.

A device such as a processing device 12 may comprise logic encoded in media for performing any step of the steps of the methods according to embodiments of the present invention (preferably automatically). Logic may comprise software encoded in a disk or other computer-readable medium and/or instructions encoded in an application specific integrated circuit (ASIC), field programmable gate array (FPGA), or other processor or hardware. A processing device 12 will also include a CPU and/a GPU and memory, the CPU and/or GPU having a processing engine able to execute software of the present invention.

The computer program product may be stored on a non-transitory signal storage medium such as an optical disk (CD-ROM or DVD-ROM), a digital magnetic tape, a magnetic disk, a solid state memory, such as a USB flash memory, a ROM, etc.

The software can be embodied in a computer program product adapted to carry out the following functions (preferably automatically) when the software is loaded onto the respective device or devices, such as the processing device 12, and executed on one or more processing engines such as microprocessors, ASICs, FPGAs etc.:
synchronizing (preferably automatically) local and remote display of the same display content using a processing device.

The software can be embodied in a computer program product adapted to carry out the following functions when the software is loaded onto the respective device or devices and executed on one or more processing engines such as microprocessors, ASICs, FPGAs etc.:
searching for presence (preferably automatically) on the processing device of an application with remote sharing capabilities,
determining (preferably automatically) whether an application with remote sharing capabilities is active on the processing device,
determining (preferably automatically) a sharing state of the application with remote sharing capabilities,
determining (preferably automatically) whether the application with remote sharing capabilities is sharing content with a remote participant,
if content is being shared remotely, determining (preferably automatically) if the same content which is being transferred to a remote participant is also being shared with a local display screen, and
if it is detected (preferably automatically) that the content which is being transferred to a remote participant and shared, is not also being shared with the local display screen, the same content is shared (preferably automatically) to the local display screen as is shared remotely.

The software can be embodied in a computer program product adapted to carry out the following functions when the software is loaded onto the respective device or devices and executed on one or more processing engines such as microprocessors, ASICs, FPGAs etc.:
If it is detected (preferably automatically) that the content which is being transferred to a remote participant and shared is different from the content being shared with the local display screen, the same content is shared (preferably automatically) to the local display screen as is shared remotely.

The software can be embodied in a computer program product adapted to carry out the following functions when the software is loaded onto the respective device or devices and executed on one or more processing engines such as microprocessors, ASICs, FPGAs etc.:
if it is determined (preferably automatically) that some content is being shared with the local display screen but there is no content shared with the remote participant or what is shared with the remote participant is different from what is shared locally, a warning is notified (preferably automatically) to the local user that content is being shared locally but not remotely or that different content is being shared,
the warning is preferably any of an audible warning, a pop-up, an optical warning a tactile warning or any combination of these.

The software can be embodied in a computer program product adapted to carry out the following functions when the software is loaded onto the respective device or devices and executed on one or more processing engines such as microprocessors, ASICs, FPGAs etc.:
Implementation as an application with remote sharing capabilities that is a UC&C application.

The software can be embodied in a computer program product adapted to carry out the following functions when the software is loaded onto the respective device or devices and executed on one or more processing engines such as microprocessors, ASICs, FPGAs etc.:
if it is detected (preferably automatically) that content is being shared remotely, determining (preferably automatically) whether the same content which is being transferred to a remote participant is also being shared by a local sharing application to a local display screen.

The software can be embodied in a computer program product adapted to carry out the following functions when the software is loaded onto the respective device or devices and executed on one or more processing engines such as microprocessors, ASICs, FPGAs etc.:
if sharing content locally is detected (preferably automatically), but sharing remotely is not detected (preferably automatically), or what is shared with the remote participant is detected (preferably automatically) as being different from what is shared locally, the application with remote sharing capabilities shares the same content remotely as is shared locally (preferably automatically).

There are various computer based methods (i.e., software based methods) to determine whether content is the same, such as using OCR to identify text, identifying image objects, e.g. by detecting edges of objects having edges with contrast jumps, or colour jumps, or correlating position of objects in two images, etc.

The software, e.g. computer product mentioned above, can be stored on a non-transitory signal storage medium, such as an optical disk (CD-ROM or DVD-ROM), a magnetic tape, a magnetic disk, a ROM, or a solid state memory, such as a USB flash memory, or similar.

While the invention has been described hereinabove with reference to a number of embodiments, this is done to illustrate and not to limit the invention, the scope of which is determined by the accompanying claims. The skilled person will appreciate that features disclosed herein in connection with individual embodiments may be combined with features from other embodiments to obtain the same technical effects and advantages, without departing from the scope of the invention.

The invention claimed is:

1. A method for synchronizing local display and remote display of display content, the method comprising:
determining whether content is being shared with a local display screen or with a remote participant; and
a) in the event that it is determined that
a1) content is being shared with the local display screen but there is no content shared with the remote participant, or
a2) content is being shared with the remote participant and there is no content shared with the local display screen, or
a3) what is shared with the remote participant is different from what is shared with the local display screen, b) then the method further comprises the step of notifying a corresponding warning to a local user.

2. The method according to claim 1, wherein the step b) of notifying a warning to a local user is
in the event a1), notifying a warning that content is shared locally but not remotely,
in the event a2), notifying a warning that content is shared remotely but not locally, and
in the event a3), notifying a warning that what is shared remotely is different from what is shared locally.

3. The method according to claim 1,
in the event a1), further comprising the step of sharing the content remotely as is shared locally,
in the event a2), further comprising the step of sharing the content locally as is shared remotely, and
in the event a3), further comprising the step of sharing the content locally as is shared remotely or further comprising the step of sharing the content remotely as is shared locally.

4. The method according to claim 1, comprising:
in the event a1), a step of an application sharing the content remotely as is shared locally, and
in the event a2), a step of an application sharing the content locally as is shared remotely, and
in the event a3), a step of an application sharing the content locally as is shared remotely or the step of an application sharing the content remotely as is shared locally.

5. The method according to claim 4, wherein the application sharing the content locally as is shared remotely is a software application with local sharing capabilities for running on a processing device, wherein the application sharing the content locally as is shared remotely is a software application with local sharing capabilities allowing sharing content with a local party, the content being one or more of the following: a specific window, a region of the screen, the full screen, a file, a presentation, and a network collaborative content.

6. The method according to claim 1, comprising using a processing device for triggering the sharing of content remotely or locally.

7. The method according to claim 1, wherein a Unified Communication and Collaboration application (UC&C app) allows sharing content with a remote party, the content being one or more of the following: a specific window, a region of the screen, the full screen, a file, a presentation, and a network collaborative content.

8. The method according to claim 7, wherein the Unified Communication and Collaboration application (UC&C app) makes use of a video conferencing cloud service, including a video conferencing node to allow one or more users located at a first video conferencing endpoint to communicate with one or more users located at a second video conferencing endpoint in a video conference.

9. The method according to claim 7, wherein the Unified Communication and Collaboration application (UC&C app) uses a collection of tools to do any of Voice-Over-Internet-Protocol (VOIP), (web) conferencing, shared whiteboarding, message exchange including chat, file transfer, or presence; or
wherein the Unified Communication and Collaboration application (UC&C app) uses a protocol-defined or standard-defined or specific communication session or interaction, including any of Voice-Over-Internet-Protocol (VOIP), text or instant messaging, Blauk, eBuddy, Gadu-Gadu, IBM Lotus Sametime, ICQ, iMessage, IMVU, Lync, MXit, Paltalk, Skype™, Tencent QQ, Windows Live Messenger™ or MSN Messenger™, Wireclub, Xfire, Twitter, or Digital Service Protocol (DSP).

10. The method according to claim 1, using an application with remote sharing capabilities for running on a processing device, which application with remote sharing capabilities allows a user of the processing device to have an audio and/or video communication with one or more remote parties; or
using an application with remote sharing capabilities allowing sharing content with a remote party, the content being one or more of the following: a specific window, a region of the screen, the full screen, a file, a presentation, a network collaborative content.

11. The method according to claim 1, comprising using a processing device and comprising:
searching for presence on the processing device of an application with remote sharing capabilities, and/or
determining whether the same or another application with remote sharing capabilities is active on the processing device,
determining a sharing state of the application with remote sharing capabilities,
determining whether the application with remote sharing capabilities is sharing content with a remote participant.

12. The method according to claim 1, comprising using a processing device and comprising, in the event that it is determined that content is being shared with the remote participant and there is no content shared with the local display screen,
searching for the presence on the processing device of an application allowing to share content locally,
launching said application, and
said application sharing the content on the local display screen as is shared remotely.

13. A non-transitory signal storage medium storing a computer program product that, when executed on a processor of a processing device, executes the method of claim 1.

14. A system for synchronizing local display and remote display of display content, the system comprising:
a processor for determining whether content is being shared with a local display screen or with a remote participant; and for providing a corresponding warning to a local user in the event that it is determined that:
a1) content is being shared with the local display screen but there is no content shared with the remote participant, or
a2) content is being shared with the remote participant and there is no content shared with the local display screen, or
a3) what is shared with the remote participant is different from what is shared with the local display screen.

15. The system according to claim 14, wherein the warning to a local user is
in the event a1), a warning that content is shared locally but not remotely,
in the event a2), a warning that content is shared remotely but not locally, and
in the event a3), a warning that what is shared remotely is different from what is shared locally.

16. The system according to claim 14, wherein the system is configured to use a processing device and wherein the processing device is configured to:
in the event a1), trigger an application for sharing the content remotely as is shared locally, in the event a2), trigger an application for sharing the content locally as is shared remotely, and in the event a3), trigger an application for sharing the content locally as is shared remotely or trigger an application sharing the content remotely as is shared locally.

17. The system according to claim 16, wherein the application for sharing the content locally as is shared remotely is a software application with local sharing capabilities for running on a processing device, wherein the application is a software application with local sharing capabilities allowing sharing content with a local party, the content being one or more of the following: a specific window, a region of the screen, the full screen, a file, a presentation, a network collaborative content.

18. The system according to claim 14, comprising using a processing device for triggering the sharing of content remotely or locally.

19. The system according to claim 14, wherein the system comprises a Unified Communication and Collaboration application (UC&C app) allowing to share content with a remote party, the content being one or more of the following: a specific window, a region of the screen, the full screen, a file, a presentation, and a network collaborative content.

20. The system according to claim 19, wherein the Unified Communication and Collaboration application (UC&C app) is configured to use a video conferencing cloud service, including a video conferencing node to allow one or more users located at a first video conferencing endpoint to communicate with one or more users located at a second video conferencing endpoint in a video conference.

21. The system according to claim 19, wherein the Unified Communication and Collaboration application (UC&C app) is configured to use a collection of tools to do any of Voice-Over-Internet-Protocol (VOIP), (web) conferencing, shared whiteboarding, message exchange including chat, file transfer, or presence; or wherein the Unified Communication and Collaboration application (UC&C app) is configured to use of a protocol-defined or standard-defined or specific communication session or interaction, including any of Voice-Over-Internet-Protocol (VOIP), text or instant messaging, Blauk, eBuddy, Gadu-Gadu, IBM Lotus Sametime, ICQ, iMessage, IMVU, Lync, MXit, Paltalk, Skype™, Tencent QQ, Windows Live Messenger™ or MSN Messenger™, Wireclub, Xfire, Twitter, and Digital Service Protocol (DSP).

22. The system according to claim 14, wherein the system is configured to use an application with remote sharing capabilities for running on a processing device, which application with remote sharing capabilities is configured to allow a user of the processing device to have an audio and/or video communication with one or more remote parties; or wherein the system is configured to use an application with remote sharing capabilities configured to allow sharing content with a remote party, the content being one or more of the following: a specific window, a region of the screen, the full screen, a file, a presentation, a network collaborative content.

23. The system according to claim 14, wherein the system is configured to use a processing device and wherein the processor is further configured for:

searching for presence on the processing device of an application with remote sharing capabilities, and/or determining whether the same or another application with remote sharing capabilities is active on the processing device, determining a sharing state of the application with remote sharing capabilities, determining whether the application with remote sharing capabilities is sharing content with a remote participant.

24. The system according to claim 14, wherein the system is configured to use a processing device and comprising, in the event that it is determined that content is being shared with the remote participant and there is no content shared with the local display screen, the processor is configured for:

searching for the presence on the processing device of an application allowing to share content locally, launching said application, and said application sharing the content on the local display screen as is shared remotely.

* * * * *